US012221679B1

United States Patent
Qian et al.

(10) Patent No.: US 12,221,679 B1
(45) Date of Patent: Feb. 11, 2025

(54) ANTIMICROBIAL ALLOY AND PREPARATION METHOD THEREOF

(71) Applicant: University of Science and Technology Beijing, Beijing (CN)

(72) Inventors: Hongchang Qian, Beijing (CN); Jianguo Gao, Beijing (CN); Weiwei Chang, Beijing (CN); Dawei Zhang, Beijing (CN)

(73) Assignee: University of Science and Technology Beijing, Beijing (CN)

( * ) Notice: Subject to any disclaimer, the term of this patent is extended or adjusted under 35 U.S.C. 154(b) by 0 days.

(21) Appl. No.: 18/588,033

(22) Filed: Feb. 27, 2024

(30) Foreign Application Priority Data

Oct. 16, 2023 (CN) .......................... 202311330358.6

(51) Int. Cl.
*C22C 30/00* (2006.01)
*A01N 59/16* (2006.01)
*A01P 1/00* (2006.01)
*C22C 1/02* (2006.01)

(52) U.S. Cl.
CPC .............. *C22C 30/00* (2013.01); *A01N 59/16* (2013.01); *A01P 1/00* (2021.08); *C22C 1/02* (2013.01)

(58) Field of Classification Search
None
See application file for complete search history.

(56) References Cited

U.S. PATENT DOCUMENTS

2020/0109467 A1   4/2020   Yang et al.

FOREIGN PATENT DOCUMENTS

| CN | 106868379 A | 6/2017 |
| CN | 110129751 A | 8/2019 |
| CN | 114134384 A | 3/2022 |

OTHER PUBLICATIONS

Zhang et al. "Effects of rare-earth element, Y, additions on the microstructure and mechanical properties of CoCrFeNi high entropy alloy." Materials Science & Engineering A 725 (2019) pp. 437-446. (Year: 2019).*

* cited by examiner

*Primary Examiner* — Brian D Walck

(57) ABSTRACT

Disclosed are an antimicrobial high-entropy alloy FeCoNi-CrCe and a preparation method thereof, falling within the technical field of high-entropy alloys. The high-entropy alloy in the present disclosure has an expression: FeCoNiCrCe$_x$, 0.1≤x≤0.5, and a proportion of each element is a molar ratio. In the present disclosure, the microstructure and mechanical and antimicrobial performances of high-entropy alloy FeCoNiCrCe$_x$ are improved by adjusting a content of Ce.

7 Claims, 7 Drawing Sheets

ANTIMICROBIAL ALLOY AND PREPARATION METHOD THEREOF

CROSS-REFERENCE TO RELATED APPLICATIONS

This application claims priority of Chinese Patent Application No. 202311330358.6, filed on Oct. 16, 2023, the entire contents of which are incorporated herein by reference.

TECHNICAL FIELD

The present disclosure relates to the technical field of high-entropy alloys, and in particular, to an antimicrobial alloy and a preparation method thereof.

BACKGROUND

A high-entropy alloy is a novel alloy material, which is usually made by smelting five or more elements. The high-entropy alloy has four typical characteristics, such as high entropy effect, lattice distortion effect, cocktail effect and slow diffusion effect, which make the alloy have excellent performances, including high strength, high hardness, good corrosion resistance and fracture resistance.

The high-entropy alloy has excellent physical and chemical performances, which make the alloy have great application potential in the research and development of medical metal materials. However, most of the existing high-entropy alloys do not have antimicrobial ability by themselves, resulting in serious limitation of the application of high-entropy alloys in the field of medical metal materials. Improving the antimicrobial ability of high-entropy alloy is the premise for its large-scale application in the field of medical metal materials.

Therefore, it is imperative to develop a high-entropy alloy with excellent antimicrobial ability and mechanical property.

SUMMARY

In view of the above, the present disclosure provides a high-entropy alloy FeCoNiCrCe with antimicrobial property and a preparation method thereof. In the present disclosure, the microstructure and mechanical and antimicrobial performances of high-entropy alloy $FeCoNiCrCe_X$ are improved by adjusting a content of Ce.

The present disclosure is realized by adopting the following technical solutions.

An antimicrobial high-entropy alloy FeCoNiCrCe has an expression: $FeCoNiCrCe_X$, $0.1 \leq x \leq 0.5$, and a proportion of each element is a molar ratio.

Preferably, the antimicrobial high-entropy alloy FeCoNiCrCe includes a face-centered cubic (FCC) phase and a $CeNi_3$ phase.

A preparation method for an antimicrobial high-entropy alloy FeCoNiCrCe of the present disclosure includes the steps of:
(1) weighing raw materials of Fe, Co, Ni, Cr and Ce according to a molar ratio for mixing, and placing a mixture in a vacuum arc furnace;
(2) vacuumizing the vacuum arc furnace to $1 \times 10^{-4}$ Pa-$5 \times 10^{-4}$ Pa, and introducing high-purity argon gas for protection, and maintaining an atmospheric pressure of argon gas at 0.03 MPa-0.08 MPa for smelting; and
(3) performing flipping and smelting on alloy material for 4-10 times during the smelting, and starting electromagnetic stirring for sufficient mixing; and cooling the alloy material to room temperature to obtain a button ingot sample.

Preferably, in step (1), the raw materials of Fe, Co, Ni, Cr and Ce have a purity of more than 99.99 wt %.

Preferably, in step (2), a smelting current is controlled between 200 A and 800 A.

Preferably, in step (3), duration of each smelting is 1-8 min.

Compared with the prior art, the present disclosure has the following advantageous effects.

Compared with the high-entropy alloy before Ce doping, having a hardness of about 130 $HV_{0.2}$, the antimicrobial high-entropy alloy of the present disclosure has a good hardness capable of reaching 200-400 $HV_{0.2}$, indicating that the hardness is significantly improved.

The antimicrobial high-entropy alloy of the present disclosure has excellent wear resistance ability, and a wear rate is reduced to 0.8 $mm^3/N \cdot m$ with the addition of Ce, indicating that the wear resistance is significantly improved.

The antimicrobial high-entropy alloy of the present disclosure has excellent antimicrobial ability, with an antimicrobial rate of 98% against *Escherichia coli* (*E. coli*) and 90% against *Staphylococcus aureus* (*S. aureus*).

In the present disclosure, the introduction of Ce into the high-entropy alloy results in the formation of a second phase $CeNi_3$ in the high-entropy alloy, and the $CeNi_3$ phase has a higher hardness than an original FCC phase in the alloy. The increase of $CeNi_3$ phase significantly improves the hardness and wear resistance property of the high-entropy alloy of the present disclosure.

DETAILED DESCRIPTION

Figure 1:
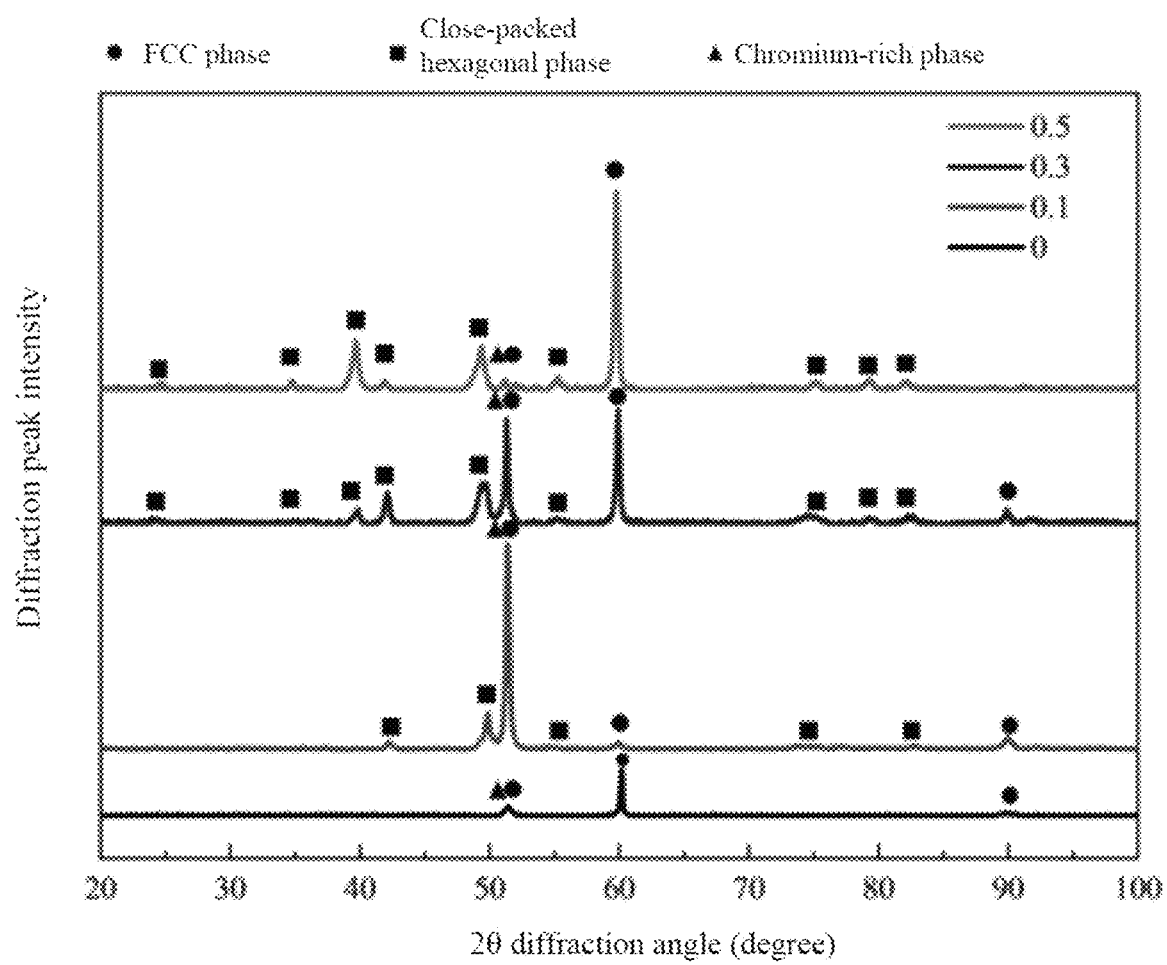
FIG. 1 is a schematic diagram showing X-ray diffraction (XRD) analysis results of the antimicrobial high-entropy alloys with different cerium contents prepared in Examples 1-3 of the present disclosure.

Hereinafter, the high-entropy alloy FeCoNiCrCe$_X$ of the present disclosure will be further explained with examples, but the protection scope of the present disclosure is not limited to the contents of the examples.

In the following examples, the microstructure, mechanical and antimicrobial performances of the prepared high-entropy alloy are tested. After the prepared antimicrobial high-entropy alloy is cut into block samples, an XRD test, mechanical performance test and antimicrobial performances test are performed. A size of the block sample is 10 mm×10 mm×2 mm. The specific test processes are as follows:

1. XRD Test

Samples are carefully ground with metallographic abrasive papers of 400 #, 800 #, 1000 #, 1200 #, 1500 # and 2000 # sequentially, and then polished. The microstructure of the FeCoNiCrCe$_X$ high-entropy alloy is analyzed with an XRD (D8 Advance, Bruker, Germany). The Co-Kα radiation is used for scanning with a diffraction angle ranged from 2θ=20°-100° and a scanning rate of 4°/min. Experimental data are analyzed by using MDI-Jade 6.0 software to determine a phase.

2. Vickers Hardness Test

The samples are taken out, carefully ground by using metallographic abrasive papers of 400 #, 800 #, 1000 #, 1200 #, 1500 # and 2000 #, and then polished. A hardness of the sample is tested by using a Bruker UMT-Tribolab type Vickers hardness tester. A test force of the Vickers hardness tester is 1.961 N (200 gf), and a loading time of the test force is set at 10 s. 5 different positions of the sample are selected to measure the Vickers hardness, a highest hardness value and a lowest hardness value are removed, and an average value of other hardness values is taken as a Vickers hardness value of the sample.

3. Friction and Wear Test

The samples are taken out, carefully ground by using metallographic abrasive papers of 400 #, 800 #, 1000 #, 1200 #, 1500 # and 2000 #, and then polished. The test sample is tested by a Bruker (CETR) UMT-2 friction and wear tester under the conditions of room temperature, an Al$_2$O$_3$ ball (φ=6 mm) as a friction pair, a scratch length being set to 3 mm by the tester, a frequency of 2 Hz, a sliding speed of 12 mm/s, a sliding time of 30 min, and an applied load being set to 5 N.

A wear rate of antimicrobial high-entropy alloy under 5 N load is calculated according to the following formula:

wear rate (mm$^3$/N·m)=wear volume/(applied load× scratch length), where, the wear volume is a volume lost after the sample is worn.

4. Antimicrobial Performance Test

Test strain: *E. coli* and *S. aureus*

The test method is as follows:

(1) Several high-entropy alloy samples are cut from an ingot, and an FeCoNiCr high-entropy alloy is taken as a control sample, with a sample size of 10 mm×10 mm×2 mm.

(2) Test samples ground to 800 #(three samples in each group), a Gram-negative bacterium (*E. coli*) and a Gram-positive bacterium (*S. aureus*) are placed in an LB medium (10 g/L of tryptone, 5 g/L of yeast extract, and 10 g/L of sodium chloride) for constant temperature culture, an initial concentration of bacteria being controlled at 10$^6$ CFU/mL, and soaked for 3 d, and finally viable bacteria are counted.

Antimicrobial rates of the antimicrobial high-entropy alloy and the control group (FeCoNiCr high-entropy alloy) against two bacteria (*E. coli* and *S. aureus*) are calculated according to the following formula:

antimicrobial rate (%)=[(viable count of surface of control sample−viable count of surface of antimicrobial high-entropy alloy)/viable count of surface of control sample]×100%, where, the viable count of surface of control sample refers to a viable count of bacteria adhered to a surface of the sample after bacterial culture on the control sample, and the viable count of antimicrobial high-entropy alloy refers to the viable count of bacteria adhered to a surface of the sample after bacterial culture on high-hardness antimicrobial high-entropy alloy.

In the following examples, due to the limitation of the testing method of antimicrobial rate, a highest value can only be detected to 99%. If an antimicrobial rate of a corresponding example is 99%, a theoretical data can reach 99.9-99.99%.

Example 1

A preparation method for an antimicrobial FeCoNiCrCe$_X$ high-entropy alloy included the following steps:

At step one, a target molar ratio of Fe:Co:Ni:Cr:Ce=1:1: 1:1:0.1 was converted into a mass ratio corresponding to raw materials of Fe, Co, Ni, Cr and Ce, and the raw materials of Fe, Co, Ni, Cr and Ce all having a purity of 99.99 wt % or more were weighed and mixed.

At step two, the raw materials in step one were placed in a vacuum arc furnace for smelting, the vacuum arc furnace was vacuumized to 2×10$^{-4}$ Pa, and argon gas was introduced until an atmospheric pressure was 0.07 MPa during the smelting to protect the smelted alloy from oxidation. A smelting current was controlled at about 450 A.

At step three, the raw materials were flipped and smelted in the vacuum arc furnace for 8 times, each smelting time for 3 min, and electromagnetic stirring was started to ensure the sufficient mixing of raw materials.

An XRD test was performed on an antimicrobial FeCoNiCrCe$_{0.1}$ high-entropy alloy in the example, and an XRD spectrum was shown in FIG. 1. From the figure, it could be seen that the antimicrobial FeCoNiCrCe$_{0.1}$ high-entropy alloy of the present disclosure included biphase of FCC+ CeNi$_3$.

Figure 2:
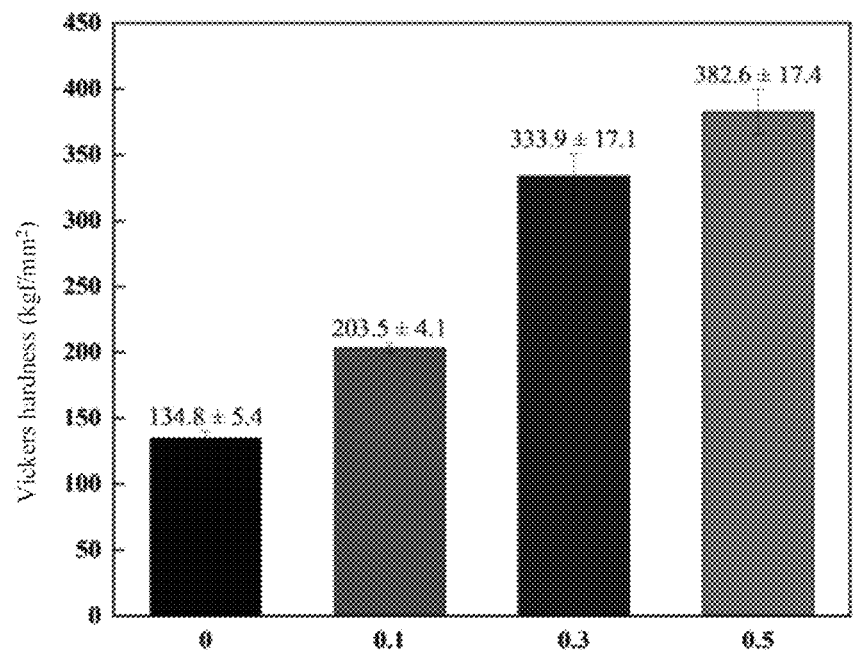
FIG. 2 is a histogram showing hardness test results of the antimicrobial high-entropy alloys with different cerium contents prepared in Examples 1-3 of the present disclosure.

A Vickers hardness test was performed on the antimicrobial FeCoNiCrCe$_{0.1}$ high-entropy alloy in the example, and test results were shown in FIG. 2. From the figure, it could be seen that a hardness of FeCoNiCrCe$_{0.1}$ was higher than that of FeCoNiCr, and a hardness value exceeded 200 HV$_{0.2}$.

Figure 3:
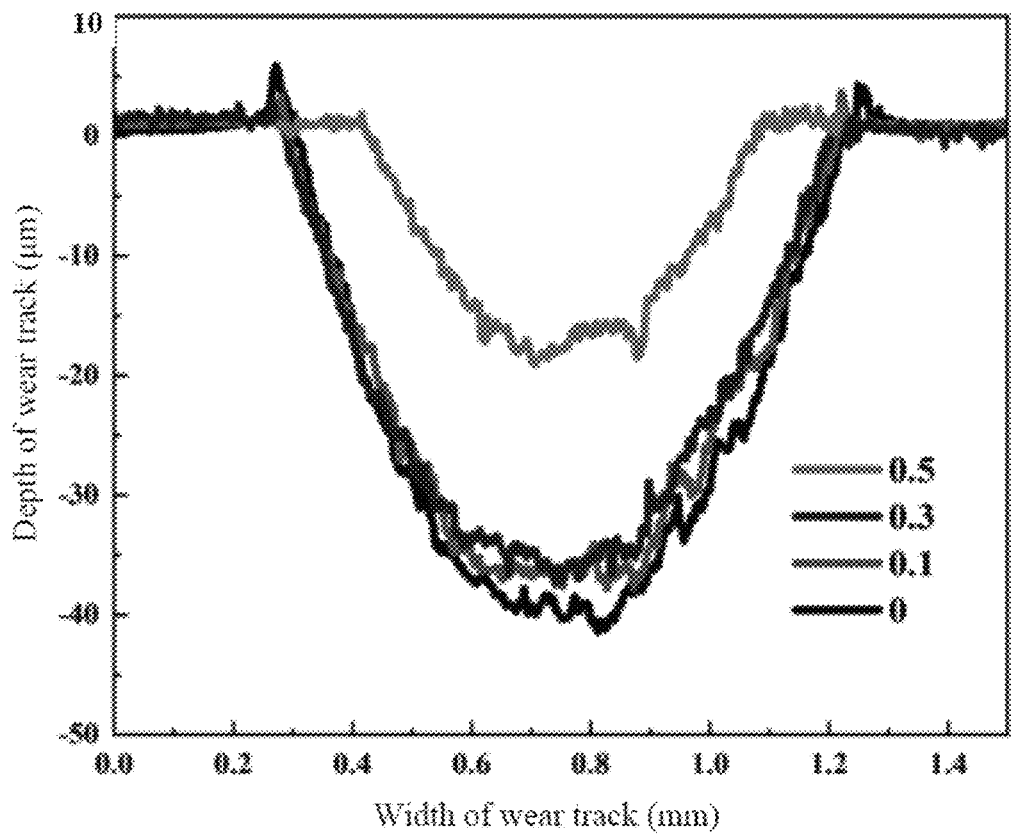
FIG. 3 is a cross-sectional profile showing wear tracks of the antimicrobial high-entropy alloys with different cerium contents prepared in Examples 1-3 of the present disclosure.
Figure 4:
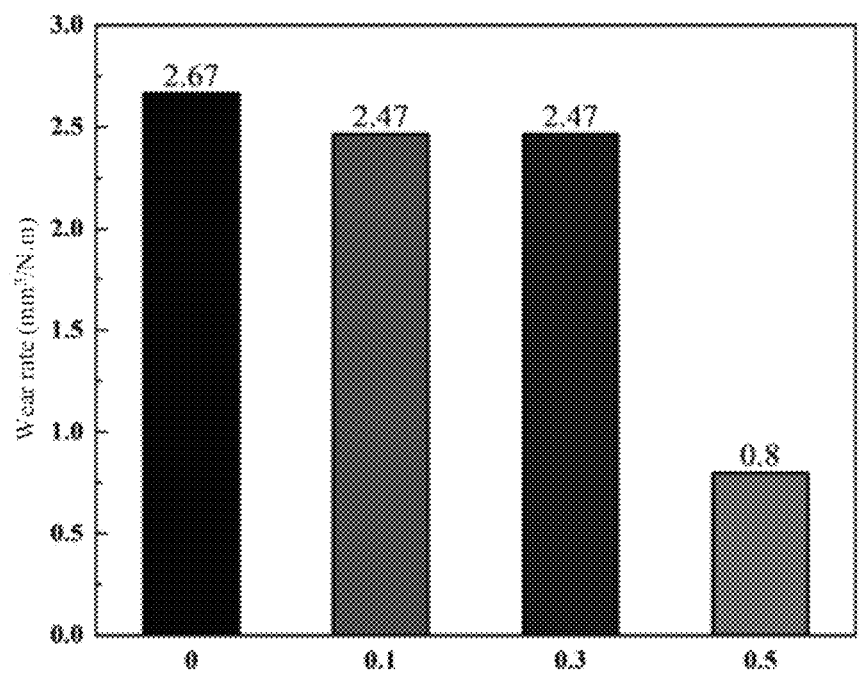
FIG. 4 is a histogram showing wear rates of the antimicrobial high-entropy alloys with different cerium contents prepared in Examples 1-3 of the present disclosure.

A friction and wear test was performed on the antimicrobial FeCoNiCrCe$_{0.1}$ high-entropy alloy in the example, and test results were shown in FIGS. 3 and 4. From the figures, it could be seen that a depth of a cross-sectional profile of a wear track of FeCoNiCrCe$_{0.1}$ was slightly reduced, and a wear rate was reduced to 2.47 mm$^3$/N·m.

Figure 5:
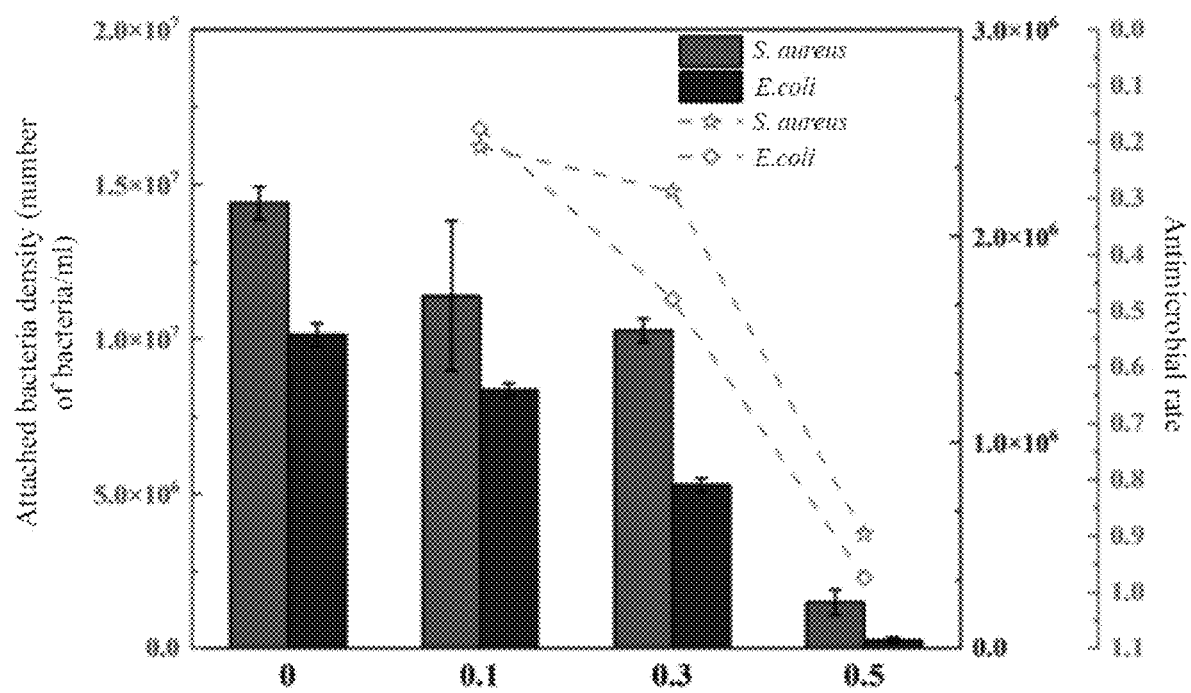
FIG. 5 is a diagram showing densities of surface-attached bacteria and antimicrobial rates of the antimicrobial high-entropy alloys with different cerium contents prepared in Examples 1-3 of the present disclosure after being soaked in culture media containing *E. coli* and *S. aureus* for 3 d.
Figure 6:
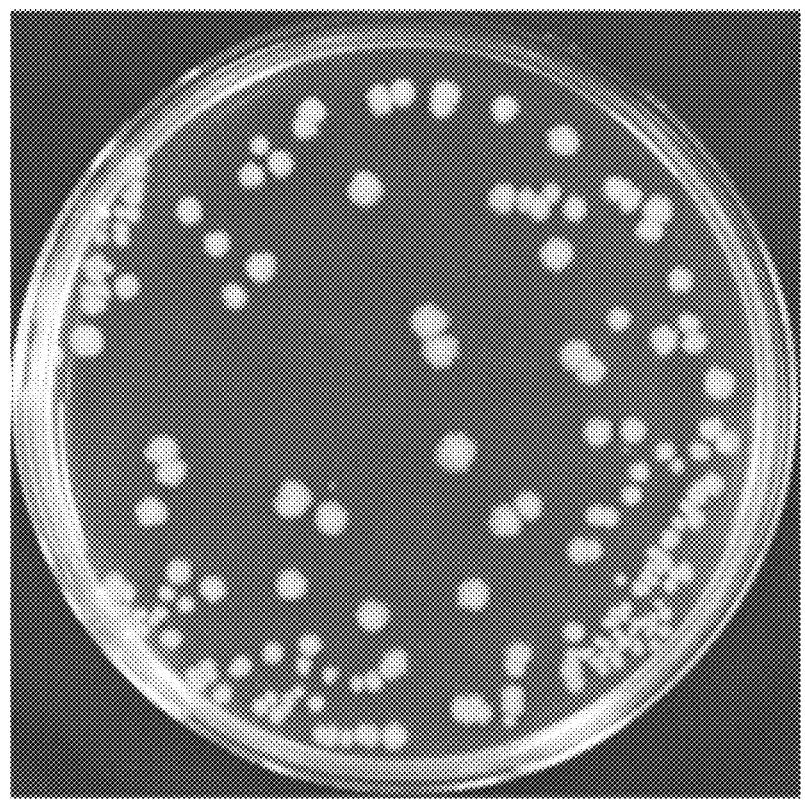
FIG. 6 is a diagram showing an antimicrobial effect of an FeCoNiCr high-entropy alloy without cerium doping after being soaked in a culture medium containing *E. coli* for 3 d.
Figure 7:
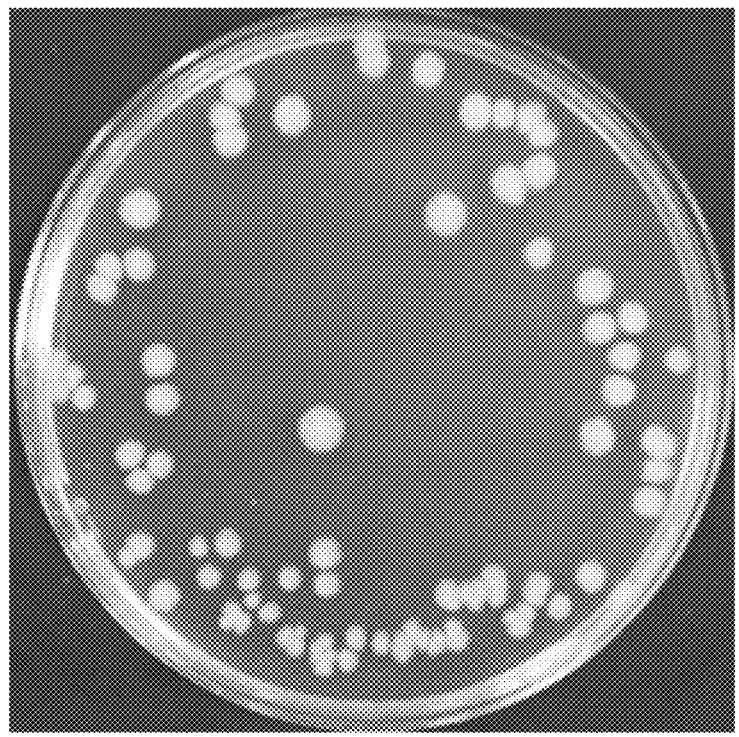
FIG. 7 is a diagram showing an antimicrobial effect of an $FeCoNiCrCe_{0.1}$ high-entropy alloy prepared in Example 1 after being soaked in a culture medium containing *E. coli* for 3 d.

The antimicrobial statistical chart of bacteria attached to the surface of the antimicrobial FeCoNiCrCe$_{0.1}$ high-entropy alloy in the example after being soaked in culture medium solutions containing *E. coli* and *S. aureus* for 3 d was shown in FIG. 5. It could be seen from the figure that after a molar ratio of the added Ce element content reached 0.1, an adhesion density of *E. coli* on the surface of alloy was 1.25×10$^6$ CFU/mL, and an antimicrobial rate of alloy against *E. coli* was 20%; and an adhesion density of *S. aureus* on the surface of alloy was 1.14×10$^7$ CFU/mL, and an antimicrobial rate of alloy against *S. aureus* was 25%.

The attached bacteria plate diagrams of the antimicrobial FeCoNiCrCe$_{0.1}$ high-entropy alloy prepared in the example after being soaked and diluted in the culture medium solutions containing *E. coli* and *S. aureus* for 3 d were shown in FIGS. 6 and 7, and FIGS. 10 and 11. Compared with the control group without Ce, the number of colonies on the plate had decreased.

Example 2

A preparation method for an antimicrobial FeCoNiCrCe$_X$ high-entropy alloy included the following steps.

At step one, a target molar ratio of Fe:Co:Ni:Cr:Ce=1:1:1:1:0.3 was converted into a mass ratio corresponding to raw materials of Fe, Co, Ni, Cr and Ce, and the raw materials of Fe, Co, Ni, Cr and Ce all having a purity of 99.99 wt % or more were weighed and mixed.

At step two, the raw materials in step one were placed in a vacuum arc furnace for smelting, the vacuum arc furnace was vacuumized to 3×10$^{-4}$ Pa, and argon gas was introduced until an atmospheric pressure was 0.04 MPa during the smelting to protect the smelted alloy from oxidation. A smelting current was controlled at about 500 A.

At step three, the raw materials were flipped and smelted in the vacuum arc furnace for 6 times, each smelting time for 5 min, and electromagnetic stirring was started to ensure the sufficient mixing of raw materials.

An XRD test was performed on an antimicrobial FeCoNiCrCe$_{0.3}$ high-entropy alloy in the example, and an XRD spectrum was shown in FIG. 1. From the figure, it could be seen that the antimicrobial FeCoNiCrCe$_{0.3}$ high-entropy alloy of the present disclosure included biphase of FCC+CeNi$_3$.

A Vickers hardness test was performed on the antimicrobial FeCoNiCrCe$_{0.3}$ high-entropy alloy in the example, and test results were shown in FIG. 2. From the figure, it could be seen that a hardness of FeCoNiCrCe$_{0.3}$ was higher than that of FeCoNiCr, and a hardness value exceeded 300 HV$_{0.2}$.

A friction and wear test was performed on the antimicrobial FeCoNiCrCe$_{0.3}$ high-entropy alloy in the example, and test results were shown in FIGS. 3 and 4. From the figures, it could be seen that a wear rate of FeCoNiCrCe$_{0.3}$ was about 2.47 mm$^3$/N·m.

The antimicrobial statistical chart of bacteria attached to the surface of the antimicrobial FeCoNiCrCe$_{0.3}$ high-entropy alloy in the example after being soaked in culture medium solutions containing *E. coli* and *S. aureus* for 3 d was shown in FIG. 5. It could be seen from the figure that after a molar ratio of the added Ce element content reached 0.3, an adhesion density of *E. coli* on the surface of alloy was 8×10$^5$ CFU/mL, and an antimicrobial rate of alloy against *E. coli* was 50%; and an adhesion density of *S. aureus* on the surface of alloy was 1.03×10$^7$ CFU/mL, and an antimicrobial rate of alloy against *S. aureus* was 30%.

Figure 8:
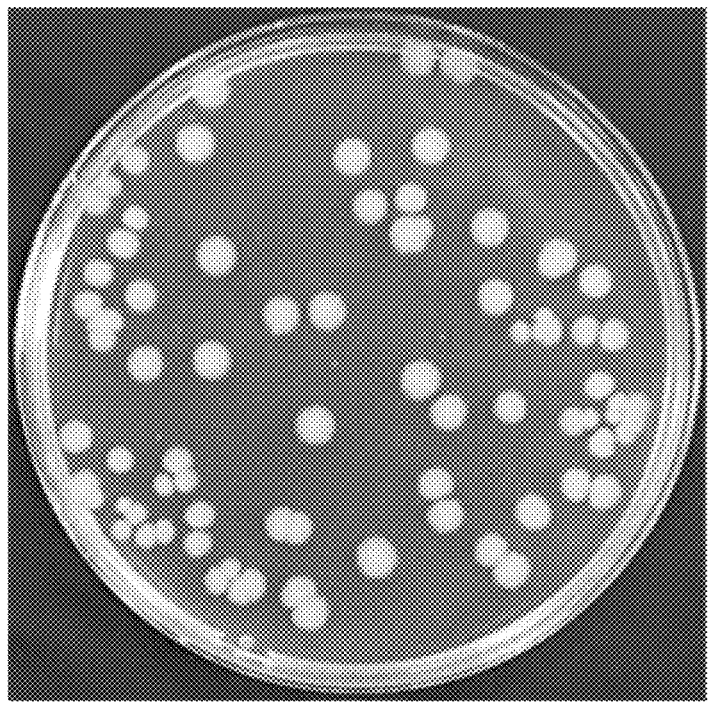
FIG. 8 is a diagram showing an antimicrobial effect of an $FeCoNiCrCe_{0.3}$ high-entropy alloy prepared in Example 2 after being soaked in a culture medium containing *E. coli* for 3 d.
Figure 12:
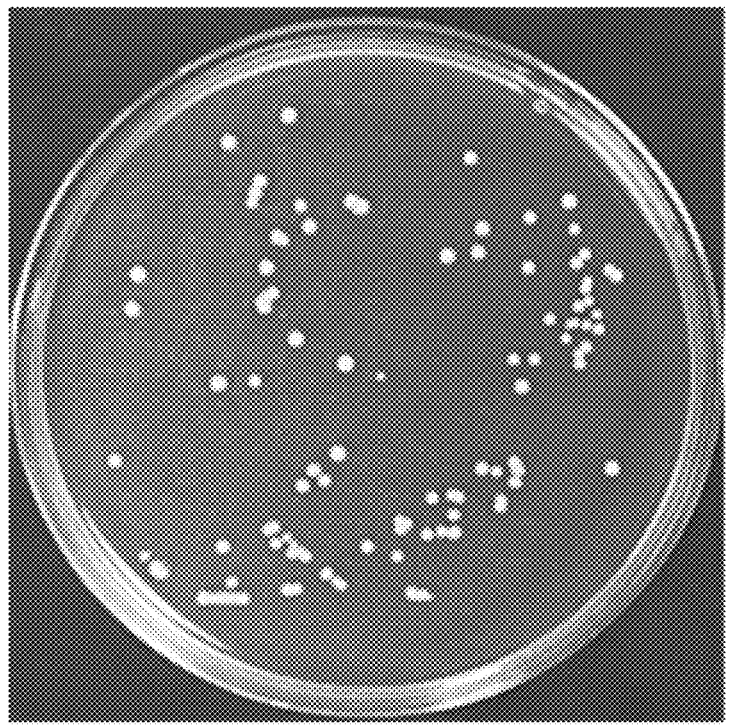
FIG. 12 is a diagram showing an antimicrobial effect of an FeCoNiCrCe$_{0.3}$ high-entropy alloy prepared in Example 2 after being soaked in a culture medium containing *S. aureus* for 3 d.

The attached bacteria plate diagrams of the antimicrobial FeCoNiCrCe$_{0.3}$ high-entropy alloy prepared in the example after being soaked and diluted in the culture medium solutions containing *E. coli* and *S. aureus* for 3 d were shown in FIGS. 8 and 12, indicating that the number of colonies on the plate was further decreased.

Example 3

A preparation method for an antimicrobial FeCoNiCrCe$_x$ high-entropy alloy included the following steps.

At step one, a target molar ratio of Fe:Co:Ni:Cr:Ce=1:1:1:1:0.5 was converted into a mass ratio corresponding to raw materials of Fe, Co, Ni, Cr and Ce, and the raw materials of Fe, Co, Ni, Cr and Ce all having a purity of 99.99 wt % or more were weighed and mixed.

At step two, the raw materials in step one were placed in a vacuum arc furnace for smelting, the vacuum arc furnace was vacuumized to 1×10$^{-4}$ Pa, and argon gas was introduced until an atmospheric pressure was 0.08 MPa during the smelting to protect the smelted alloy from oxidation. A smelting current was controlled at about 600 A.

At step three, the raw materials were flipped and smelted in the vacuum arc furnace for 10 times, each smelting time for 8 min, and electromagnetic stirring was started to ensure the sufficient mixing of raw materials.

An XRD test was performed on an antimicrobial FeCoNiCrCe$_{0.5}$ high-entropy alloy in the example, and an XRD spectrum was shown in FIG. 1. From the figure, it could be seen that the antimicrobial FeCoNiCrCe$_{0.5}$ high-entropy alloy of the present disclosure included biphase of FCC+CeNi$_3$.

A Vickers hardness test was performed on the antimicrobial FeCoNiCrCe$_{0.5}$ high-entropy alloy in the example, and test results were shown in FIG. 2. From the figure, it could be seen that a hardness of FeCoNiCrCe$_{0.5}$ was higher than that of FeCoNiCr, and a hardness value was close to 400 HV$_{0.2}$.

A friction and wear test was performed on the antimicrobial FeCoNiCrCe$_{0.5}$ high-entropy alloy in the example, and test results were shown in FIGS. 3 and 4. From the figures, it could be seen that a width and a depth of a cross-sectional profile of a wear track of FeCoNiCrCe$_{0.5}$ were significantly reduced, and a wear rate was reduced to 0.8 mm$^3$/N·m.

The antimicrobial statistical chart of bacteria attached to the surface of the antimicrobial FeCoNiCrCe$_{0.5}$ high-entropy alloy in the example after being soaked in culture medium solutions containing *E. coli* and *S. aureus* for 3 d was shown in FIG. 5. It could be seen from the figure that after a molar ratio of the added Ce element content reached 0.5, an adhesion density of *E. coli* on the surface of alloy was 4×10$^4$ CFU/mL, and an antimicrobial rate of alloy against *E. coli* was 98%; and an adhesion density of *S. aureus* on the surface alloy was 1.5×10$^6$ CFU/mL, and an antimicrobial rate of alloy against *S. aureus* was 90%.

Figure 9:
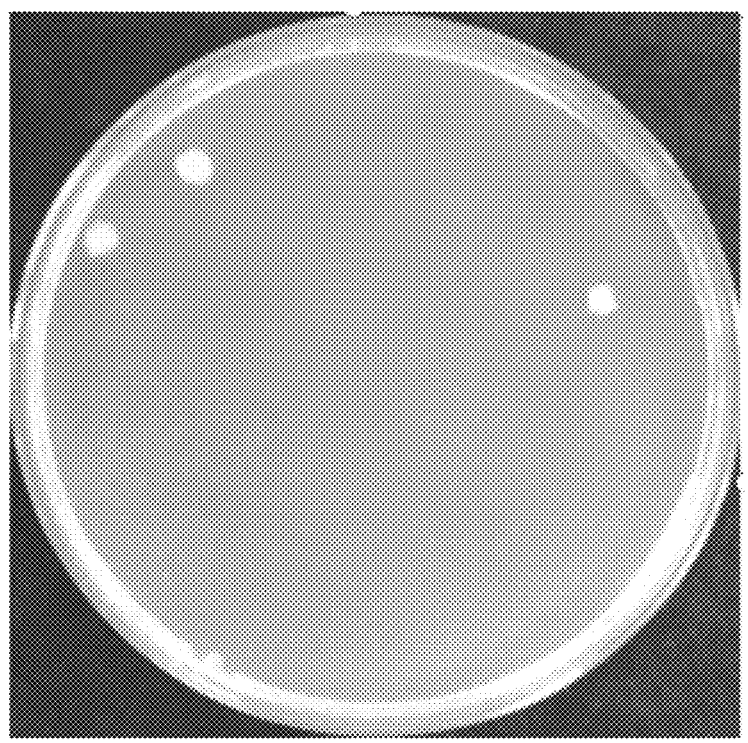
FIG. 9 is a diagram showing an antimicrobial effect of an FeCoNiCrCe$_{0.5}$ high-entropy alloy prepared in Example 3 after being soaked in a culture medium containing *E. coli* for 3 d.
Figure 10:
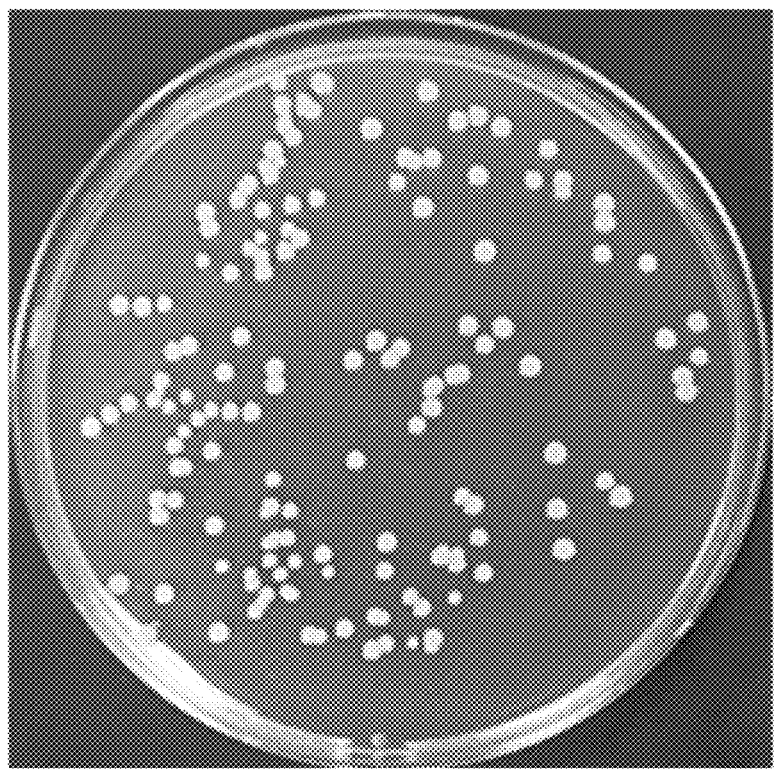
FIG. 10 is a diagram showing an antimicrobial effect of an FeCoNiCr high-entropy alloy without cerium doping after being soaked in a culture medium containing *S. aureus* for 3 d.
Figure 11:
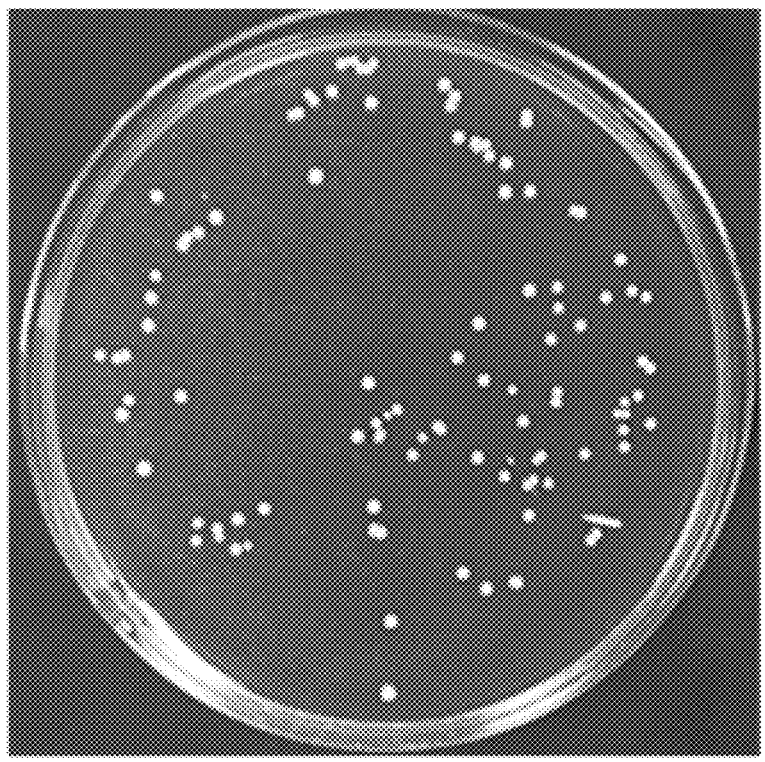
FIG. 11 is a diagram showing an antimicrobial effect of an FeCoNiCrCe$_{0.1}$ high-entropy alloy prepared in Example 1 after being soaked in a culture medium containing *S. aureus* for 3 d.
Figure 13:
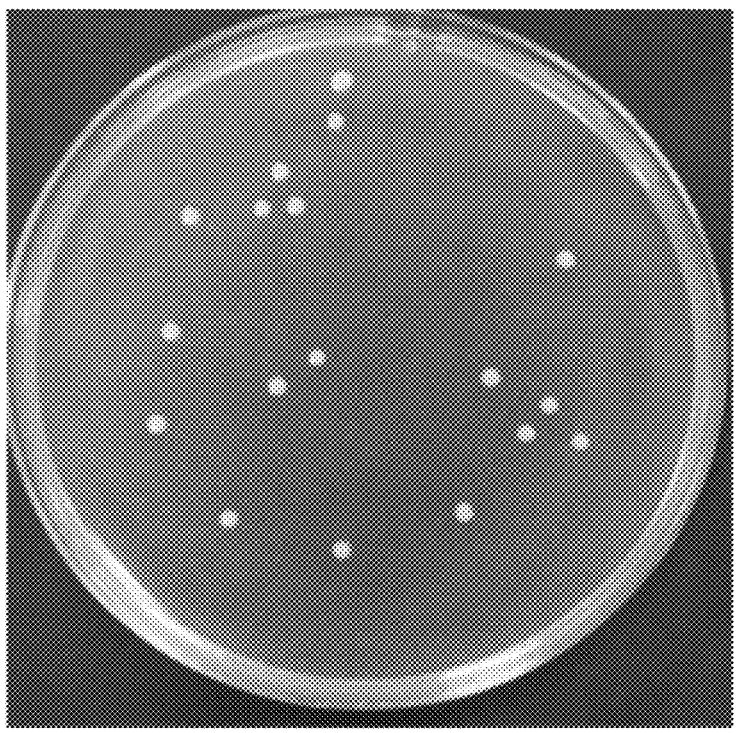
FIG. 13 is a diagram showing an antimicrobial effect of an FeCoNiCrCe$_{0.5}$ high-entropy alloy prepared in Example 3 after being soaked in a culture medium containing *S. aureus* for 3 d.

The attached bacteria plate diagrams of the antimicrobial FeCoNiCrCe$_{0.5}$ high-entropy alloy prepared in the example after being soaked and diluted in the culture medium solutions containing *E. coli* and *S. aureus* for 3 d were shown in FIGS. 9 and 13, indicating that the number of colonies on the plate drops sharply.

To sum up, the $FeCoNiCrCe_X$ high-entropy alloy in the present disclosure had significant improvements in hardness, wear resistance and antimicrobial performances compared with the high-entropy alloy without Ce doping in the as-cast condition, and the high cerium content endowed the high-entropy alloy with excellent mechanical and antimicrobial performances.

The above-mentioned examples are only for explaining the technical solutions of the present disclosure, and the purpose is to enable people familiar with this technology to understand the content of the present disclosure and implement it accordingly, without limiting the protection scope of the present disclosure. All equivalent changes or modifications made according to the spirit of the present disclosure are to be included in the protection scope of the present disclosure.

The invention claimed is:

1. An antimicrobial alloy, the antimicrobial alloy having an expression: $FeCoNiCrCe_x$, x being equal to 0.5, a proportion of each element being a molar ratio, wherein
    the antimicrobial alloy has an antimicrobial rate of 98% against *Escherichia coli* (*E. coli*) and 90% against *Staphylococcus aureus* (*S. aureus*).

2. The antimicrobial alloy according to claim 1, wherein the antimicrobial alloy comprises a face-centered cubic (FCC) phase and a $CeNi_3$ phase.

3. A preparation method for the antimicrobial alloy according to claim 1, comprising the steps of:
    (1) weighing raw materials of Fe, Co, Ni, Cr and Ce according to a molar ratio for mixing, and placing a mixture in a vacuum arc furnace;
    (2) vacuumizing the vacuum arc furnace to $1\times10^{-4}$ Pa-$5\times10^{-4}$ Pa, and introducing high-purity argon gas for protection, and maintaining an atmospheric pressure of argon gas at 0.03 MPa-0.08 MPa for smelting; and
    (3) performing flipping and smelting on alloy material for 4-10 times during the smelting, and starting electromagnetic stirring for sufficient mixing; and cooling the alloy material to room temperature to obtain a button ingot sample.

4. A preparation method for the antimicrobial alloy according to claim 2, comprising the steps of:
    (1) weighing raw materials of Fe, Co, Ni, Cr and Ce according to a molar ratio for mixing, and placing a mixture in a vacuum arc furnace;
    (2) vacuumizing the vacuum arc furnace to $1\times10^{-4}$ Pa-$5\times10^{-4}$ Pa, and introducing high-purity argon gas for protection, and maintaining an atmospheric pressure of argon gas at 0.03 MPa-0.08 MPa for smelting; and
    (3) performing flipping and smelting on alloy material for 4-10 times during the smelting, and starting electromagnetic stirring for sufficient mixing; and cooling the alloy material to room temperature to obtain a button ingot sample.

5. The preparation method according to claim 3, wherein in step (1), the raw materials of Fe, Co, Ni, Cr and Ce have a purity of more than 99.99 wt %.

6. The preparation method according to claim 3, wherein in step (2), a smelting current is controlled between 200 A and 800 A.

7. The preparation method according to claim 3, wherein in step (3), duration of each smelting is 1-8 min.

* * * * *